United States Patent [19]

Maiworm et al.

[11] Patent Number: 5,454,628
[45] Date of Patent: Oct. 3, 1995

[54] CONFIGURATION FOR PREVENTING CONTACT CORROSION IN MAGNESIUM WHEELS

[75] Inventors: Friedhelm Maiworm, Werdohl; Hans-Joachim Pforr, Neuenrade, both of Germany

[73] Assignee: Stahlschmidt & Maiworm GmbH, Bad Duerkheim, Germany

[21] Appl. No.: 228,685

[22] Filed: Apr. 18, 1994

[30] Foreign Application Priority Data

Aug. 18, 1992 [DE] Germany ............... 42 27 259.9

[51] Int. Cl.⁶ .................................................. B60B 19/00
[52] U.S. Cl. .................. 301/65; 301/6.91; 301/35.62
[58] Field of Search ................... 301/6.1, 6.91, 301/64.7, 65, 111, 114, 37.31, 37.35, 37.36, 37.42, 35.62

[56] References Cited

U.S. PATENT DOCUMENTS

| | | | |
|---|---|---|---|
| 3,207,557 | 9/1965 | Hunter | 301/5.21 |
| 3,649,079 | 3/1972 | English | 301/65 X |
| 4,530,542 | 7/1985 | Speigel et al. | 301/65 X |
| 4,900,097 | 2/1990 | Kostov et al. | 301/6.91 X |
| 5,108,156 | 4/1992 | Bell | 301/6.1 |

FOREIGN PATENT DOCUMENTS

| | | |
|---|---|---|
| 2207771 | 8/1973 | Germany. |
| 88095819 | 1/1989 | Germany. |
| 89016602 | 7/1989 | Germany. |
| 4227259 | 3/1994 | Germany. |
| 0091401 | 7/1980 | Japan ............ 301/65 |

Primary Examiner—Russell D. Stormer
Attorney, Agent, or Firm—Herbert L. Lerner; Laurence A. Greenberg

[57] ABSTRACT

In order to prevent contact corrosion when a magnesium wheel is fixed to a wheel mount of a motor vehicle, a configuration is provided in which an annular aluminum spacer is inserted between an inner contact surface of the magnesium wheel and the wheel mount in the vicinity of fixing bores. A central centering device in the form of an annular plastic adapter is squeezed into a hub bore of the magnesium wheel in order to cover the radially inner peripheral surface of the spacer and to center the same.

7 Claims, 2 Drawing Sheets

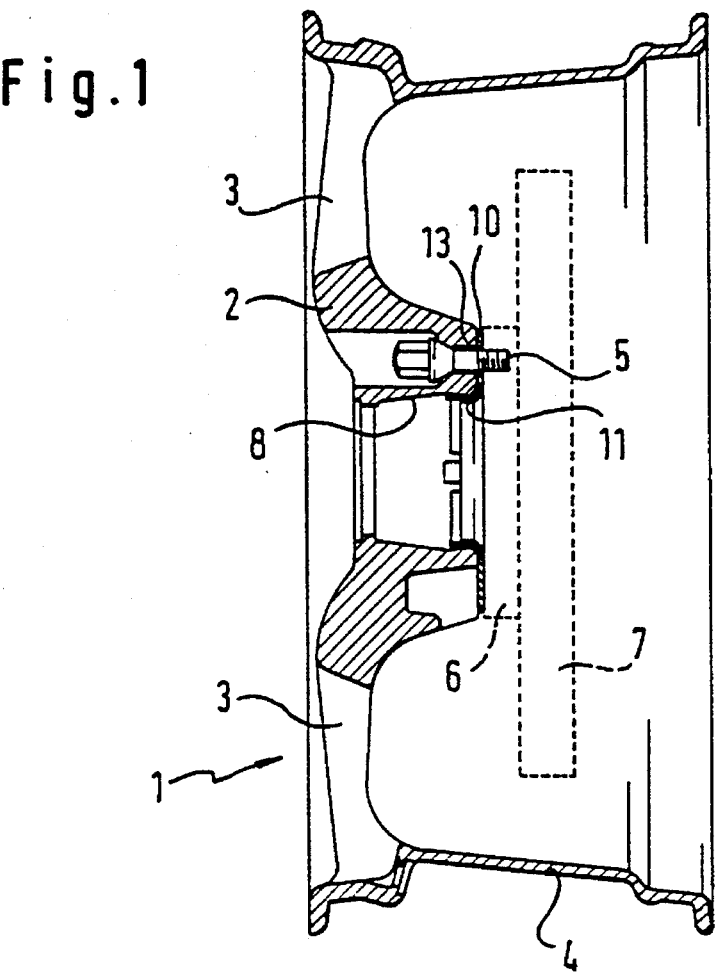
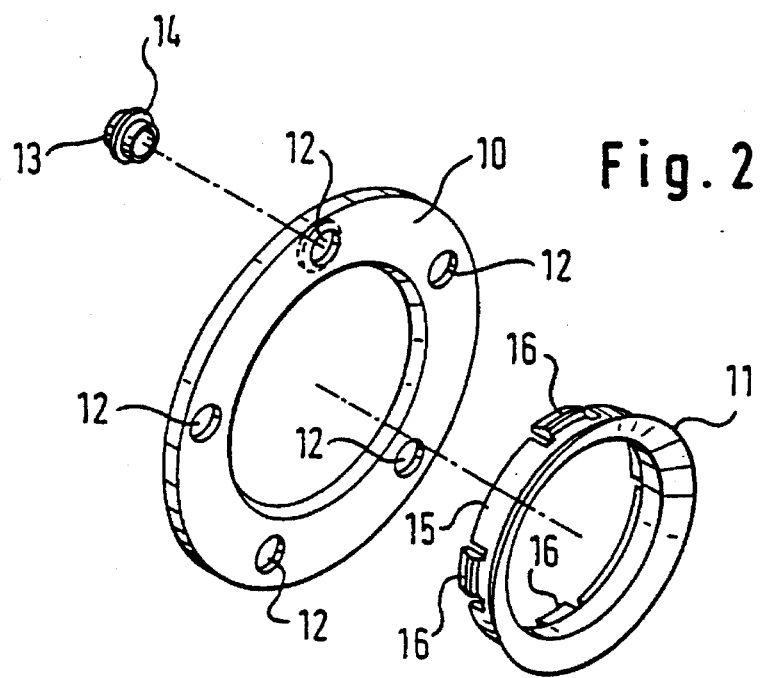

CONFIGURATION FOR PREVENTING CONTACT CORROSION IN MAGNESIUM WHEELS

CROSS-REFERENCE TO RELATED APPLICATION

This application is a Continuation of International Application Serial No. PCT/DE93/00752, filed Aug. 18, 1993.

BACKGROUND OF THE INVENTION

FIELD OF THE INVENTION

The invention relates to a configuration for preventing contact corrosion in the fixation of a magnesium wheel to a wheel mount of a motor vehicle.

In expensive passenger motor vehicles, the wheels carrying the tires are increasingly being made of light metal in order to reduce the weight of the mass which is not affected by springs and thus to improve travel comfort. In the case of wheels of that type, aluminum has heretofore been the material that was mainly used. An even lighter weight and thus a further reduction in the mass which is not affected by springs is achieved if magnesium is used for the wheels.

Wheels of that type are conventionally screwed firmly to the wheel mounts of the vehicle axles and the wheel supports are formed of steel or cast steel.

However, the direct contact of magnesium and steel can lead to what is known as contact corrosion, which can permanently damage the metal crystalline structure of the magnesium wheel, thus reducing the service life of such a magnesium wheel.

SUMMARY OF THE INVENTION

It is accordingly an object of the invention to provide a configuration for preventing contact corrosion in magnesium wheels, which overcomes the hereinafore-mentioned disadvantages of the heretofore-known devices of this general type and in which direct contact between magnesium and steel is avoided, without in any way limiting the strength of the connection between the magnesium wheel and the wheel mount on the vehicle.

With the foregoing and other objects in view there is provided, in accordance with the invention, in a fixation of a magnesium wheel having an inner contact surface, a hub bore and fixing bores, to a wheel mount of a motor vehicle having a wheel mounting surface, a configuration for preventing contact corrosion in the fixation, comprising an annular aluminum spacer or distance washer having a radially inner peripheral surface and being inserted between the inner contact surface of the magnesium wheel and the wheel mounting surface of the wheel mount in the vicinity of the fixing bores; and centering means in the form of an annular plastic adapter being squeezed into the hub bore, covering the radially inner peripheral surface of the spacer and centering the spacer.

With this interposition of an aluminum spacer or distance washer between the magnesium wheel and the steel wheel mount in the region of substantial pressure, direct contact between magnesium and steel is avoided, since contact corrosion between magnesium and aluminum and aluminum and steel is virtually non-existent. The remaining, non-stressed contact areas between the magnesium wheel and the wheel mount are separated by plastic parts having sufficient pressure resistance.

In accordance with another feature of the invention, the spacer has axially parallel bores corresponding to the fixing bores of the magnesium wheel and an inner peripheral surface which tapers conically towards the magnesium wheel and on which the correspondingly conically widening outer peripheral surface of the plastic adapter bears.

In accordance with a further feature of the invention, at least one of the bores in the spacer has a countersunk depression on its side making contact with the magnesium wheel, and a centering bush with a centrally, radially projecting collar is inserted into the bore in such a way that the collar completely fills the depression and is flush with the plane or planar surface of the spacer.

In accordance with an added feature of the invention, the plastic adapter itself has a cylindrical section with a plurality of axially punched locking lugs and an adjoining section conically widening on the inner and outer periphery with an inner diameter corresponding to the outer diameter of the centering attachment of the wheel mount.

In accordance with an additional feature of the invention, in order to fix the adapter to the magnesium wheel, the hub bore of the wheel has a radial widening into which the locking lugs of the adapter can engage.

In accordance with yet another feature of the invention, the plastic adapter is formed of glass-reinforced nylon, the same material from which the centering bush is made.

In accordance with yet a further feature of the invention, the centering bush has a slightly larger inner diameter than the outer diameter of the fixing screws, and an outer diameter corresponding to the bore diameters in the spacer and in the magnesium wheel for the fixing screws, in order to permit exact alignment of the spacer with the magnesium wheel.

In accordance with a concomitant feature of the invention, the aluminum spacer itself has a thickness of approximately 3 to 5 mm.

Other features which are considered as characteristic for the invention are set forth in the appended claims.

Although the invention is illustrated and described herein as embodied in a configuration for preventing contact corrosion in magnesium wheels, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic, longitudinal-sectional view of a fully mounted magnesium wheel;

FIG. 2 is an exploded perspective view of an adapter, a spacer and a centering bush.

DESCRIPTION OF THE PREFERRED EMBODIMENTS

Figure 3:
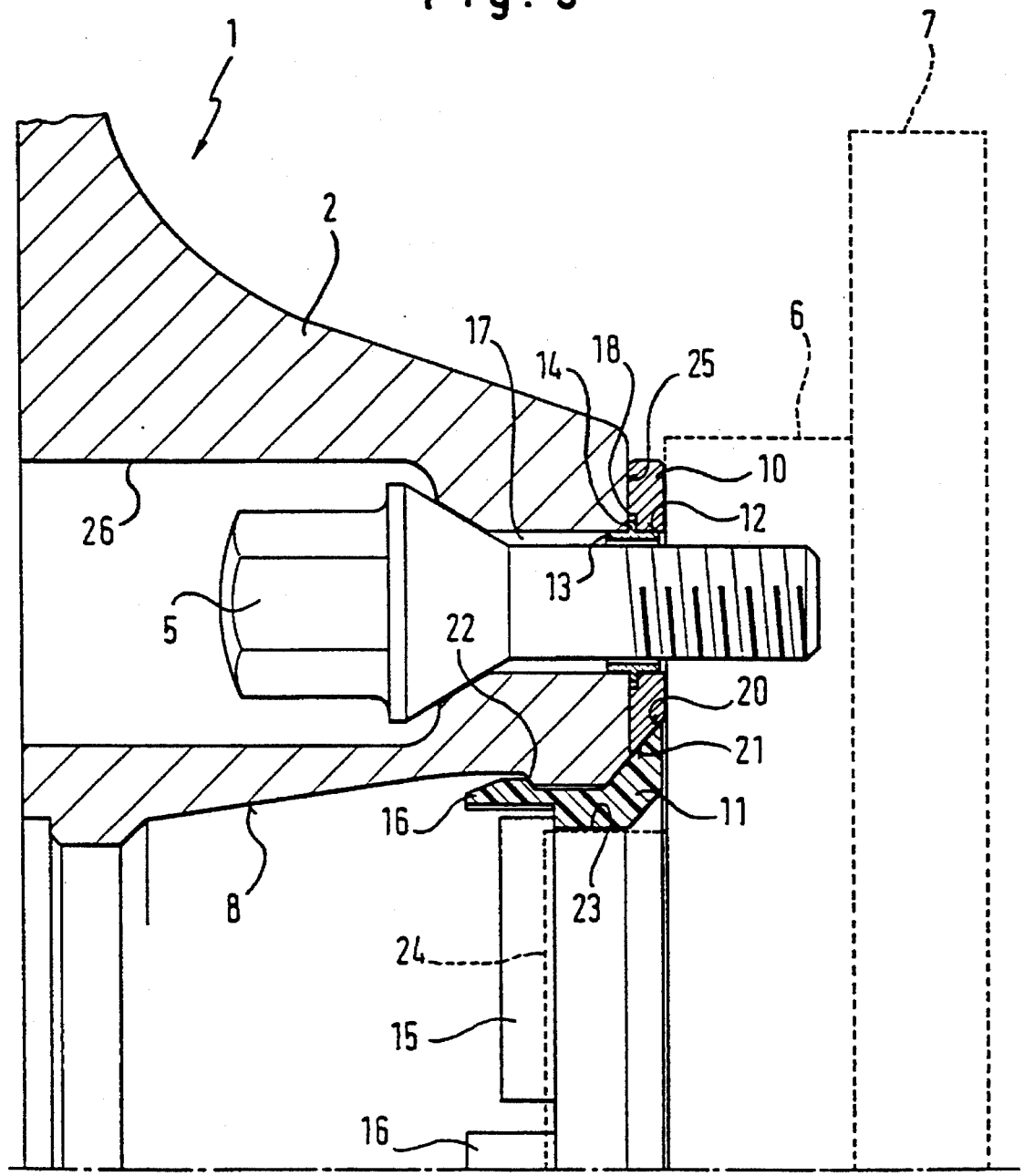
FIG. 3 is an enlarged, fragmentary, longitudinal-sectional view of the magnesium wheel in the region of a fixing screw.

Referring now to the figures of the drawing in detail and first, particularly, to FIG. 1 thereof, there is seen a section through a magnesium disc wheel 1 with a hub 2, spokes 3 and a rim well 4 for receiving a non-illustrated tire. In the region of the hub 2, corresponding screws 5 connect this magnesium wheel to a wheel mount 6 which is shown in broken lines. The wheel mount 6 is on the outside relative to a brake disc 7, which is also shown in broken lines. An annular aluminum spacer or distance washer 10 is disposed between the magnesium wheel 1 and the wheel mount 6, in the region of the screws 5. The annular aluminum spacer 10 is radially centered on the inside relative to a plastic adapter 11 which is clamped into a hub bore 8.

In FIG. 2, the individual parts for preventing contact corrosion are shown again in an exploded perspective view, and they are shown individually in the enlarged fragmentary longitudinal-section view according to FIG. 3. As can be seen from FIG. 2, the aluminum spacer 10 has five axially parallel bores 12 formed therein, which are flush with corresponding bores in the hub 2 for the fixing screws 5. In order to insert into one of these bores 12, a centering bush 13 is provided, which has a function that will be described below.

The plastic adapter 11 has a rear cylindrical region 15 in which four punched locking lugs 16 are provided in order to lock into the wheel hub.

As can also be seen from the enlarged longitudinal section in FIG. 3, the bores 12 in the aluminum spacer 10 inserted between the hub 2 of the magnesium wheel 1 and the wheel mount 6, have a diameter which corresponds exactly to bores 17 in the wheel hub 2.

The cylindrical centering bush 13 is inserted into one of the bores 12 in the spacer 10. The centering bush 13 has a central, radially projecting collar 14, which engages in a depression 18 formed in a wheel-side end surface of the spacer 10. This centering bush 13 is thus held in the spacer 10 and extends into the bore 17 of the wheel hub 2 in order to align the spacer 10 precisely.

An inner periphery of the spacer 10 has a peripheral surface 20 which tapers conically towards the magnesium wheel 1 and on which a correspondingly conically widening outer peripheral surface 21 of the plastic adapter 11 bears. The cylindrical region 15 of this plastic adapter 11 projects into the hub bore 8. As can be seen in particular from the longitudinal sectional view according to FIG. 3, the slightly elongate locking lugs 16 which are punched out of the cylindrical region 15 engage the hub 2 in the hub bore 8 with a radial widening 22.

The plastic adapter 11 has an adjoining section with an inner periphery 23 which rests exactly over an outer periphery of a centering projection or attachment 24 (shown in broken lines) of the wheel mount 6.

The assembly of the individual parts, namely the spacer 10 and the adapter 11 on the magnesium wheel 1 is advantageously carried out as follows: first the centering bush 13 is inserted into the bore 12 of the spacer 10 having the depression 18 in such a manner that the collar 14 does not project above a planar surface 25 of the spacer 10.

Then the magnesium wheel 1 is laid on the ground with its normally visible side at the bottom, and the centering bush 13 which is mounted with the spacer 10 is inserted into one of the bores 17 in the wheel hub 2. Then the spacer 10 is rotated until all of the bores 12 in the spacer 10 are aligned with the bores 17 in the hub 2.

Then the plastic adapter 11 is pushed through a central aperture in the spacer 10, which is defined by the surface 20, until the locking lugs 16 audibly engage the hub in the hub bore 8. This then ensures precise centering and mounting of the spacer 10 relative to the magnesium wheel 1. Then the conical collar screws 5 which are made of titanium are inserted from the outside of the magnesium wheel 1 through widened blind bores 26 and the wheel 1 is screwed therewith to the wheel mount 6.

The spacer 10 advantageously has a thickness of approximately 3 to 5 mm and is made of pressure-resistant aluminum, which experiences no contact corrosion with the magnesium of the wheel or the steel of the wheel mount.

The adapter 11 is advantageously made of glass-reinforced nylon and is therefore also very strong. The centering bush 13 may also be manufactured from the same material.

With the above-described configuration and the correspondingly formed parts, it is possible to simply and reliably prevent contact corrosion with the steel wheel mount when a magnesium disc wheel is used, since all possible contact surfaces are separated by aluminum in the pressure region and plastic material in the purely form-locking region. A form-locking connection is one which connects two elements together due to the shape of the elements themselves, as opposed to a force-locking connection, which locks the elements together by force external to the elements.

We claim:

1. In a fixation of a magnesium wheel having an inner contact surface, a hub bore and fixing bores, to a wheel mount of a motor vehicle having a wheel mounting surface, a configuration for preventing contact corrosion in the fixation, comprising:

an annular aluminum spacer having a radially inner peripheral surface and being inserted between the inner contact surface of the magnesium wheel and the wheel mounting surface of the wheel mount in the vicinity of the fixing bores; and centering means in the form of an annular plastic adapter being squeezed into the hub bore, covering said radially inner peripheral surface of said spacer and centering said spacer;

wherein said spacer has axially parallel bores formed therein corresponding to the fixing bores in the magnesium wheel, said inner peripheral surface of said spacer tapers conically towards the magnesium wheel, and said plastic adapter has a conically widening outer peripheral surface corresponding to and bearing against said inner peripheral surface of said spacer.

2. The configuration according to claim 1, wherein said spacer has a planar surface contacting the magnesium wheel, said planar surface has a countersunk depression formed therein at least at one of said bores, and including a centering bush being inserted into said at least one bore and having a central radially projecting collar completely filling said depression and being flush with said planar surface of said spacer.

3. The configuration according to claim 1, wherein the wheel mount has a centering attachment with an outer periphery, and said plastic adapter has a cylindrical region with a plurality of axially punched locking lugs and an adjoining section with conically widening inner and outer peripheries, said inner periphery of said adjoining section corresponding to said outer periphery of said centering attachment.

4. The configuration according to claim 3, wherein the magnesium wheel has a radial widening at the hub bore in which said locking lugs of said plastic adapter engage.

5. The configuration according to claim 3, wherein said plastic adapter is formed of glass fiber-reinforced nylon.

6. The configuration according to claim 1, wherein said aluminum spacer has a thickness of approximately 3 to 5 mm.

7. The configuration according to claim 2, including fixing screws having an outer diameter, said centering bush having an inner diameter being slightly larger than the outer diameter of said fixing screws for accommodating said fixing screws, and said centering bush having an outer diameter corresponding to diameters of said bores in said spacer and the bores in the magnesium wheel.

* * * * *